(12) United States Patent
Asai

(10) Patent No.: US 8,522,910 B2
(45) Date of Patent: Sep. 3, 2013

(54) VEHICLE UNDERBODY STRUCTURE

(75) Inventor: Takashi Asai, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/145,545

(22) PCT Filed: Sep. 8, 2009

(86) PCT No.: PCT/JP2009/065687
§ 371 (c)(1),
(2), (4) Date: Jul. 20, 2011

(87) PCT Pub. No.: WO2011/030400
PCT Pub. Date: Mar. 17, 2011

(65) Prior Publication Data
US 2011/0278881 A1 Nov. 17, 2011

(51) Int. Cl.
B60K 13/04 (2006.01)
(52) U.S. Cl.
USPC .............. 180/309; 280/784; 280/781
(58) Field of Classification Search
USPC ............... 180/309, 296, 89.2; 280/784, 781, 280/834; 296/204, 187.11
See application file for complete search history.

(56) References Cited

U.S. PATENT DOCUMENTS

| 4,408,675 | A | * | 10/1983 | Keller | 180/296 |
| 5,174,628 | A | * | 12/1992 | Hayatsugu et al. | 296/187.11 |
| 5,364,128 | A | * | 11/1994 | Ide | 280/784 |
| 5,813,491 | A | * | 9/1998 | Sato et al. | 180/309 |
| 6,105,708 | A | * | 8/2000 | Amano et al. | 180/309 |
| 7,237,644 | B2 | * | 7/2007 | Matsumoto et al. | 180/309 |
| 7,331,611 | B2 | * | 2/2008 | Kusu et al. | 280/834 |
| 7,383,912 | B2 | * | 6/2008 | Kondo et al. | 180/296 |
| 7,658,440 | B2 | * | 2/2010 | Tohda et al. | 296/204 |
| 7,997,376 | B2 | * | 8/2011 | Fujita | 180/309 |

FOREIGN PATENT DOCUMENTS

| JP | 59-140125 A | 8/1984 |
| JP | 03-103880 U | 10/1991 |
| JP | 5-927 U | 1/1993 |
| JP | 5-87223 U | 11/1993 |
| JP | 2006-062494 A | 3/2006 |
| JP | 2007-276614 A | 10/2007 |

OTHER PUBLICATIONS

International Search Report issued Dec. 8, 2009 & Written Opinion of PCT/JP2009/065687.

* cited by examiner

Primary Examiner — Hau Phan
(74) Attorney, Agent, or Firm — Kenyon & Kenyon LLP

(57) ABSTRACT

To obtain a vehicle underbody structure that is capable of ensuring the capacity of a fuel tank while suppressing an increase in the size of the fuel tank. A fuel tank is mounted behind a front floor and under a center floor. An exhaust pipe partially overlaps the fuel tank when a vehicle is seen in a plan view, and the exhaust pipe is positioned between the fuel tank and the center floor at this overlapping section.

5 Claims, 12 Drawing Sheets

VEHICLE UNDERBODY STRUCTURE

This is a 371 national phase application of PCT/JP2009/065687 filed 8 Sep. 2009, the contents of which are incorporated herein by reference.

TECHNICAL FIELD

The present invention relates to a vehicle underbody structure where a floor member, a fuel tank, and an exhaust pipe are placed on the underbody of a vehicle.

BACKGROUND ART

As a vehicle underbody structure, in patent document 1 (JP-A No. 2007-276614), there is described a structure where a substantially U-shaped recessed portion that extends in a vehicle front-rear direction is formed in the center of a lower surface portion of a fuel tank and where the middle section of an exhaust pipe is disposed in the recessed portion.

Incidentally, taking the liquid surface of the fuel inside the fuel tank as a boundary, the portion on the lower side becomes a liquid layer and the portion on the upper side becomes a gas layer, so when a recessed portion is disposed in the lower portion of the fuel tank as described in patent document 1, the fuel quantity that can be contained in the fuel tank decreases by that amount. Additionally, in order to ensure the fuel quantity containable in the fuel tank, this leads to an increase in the size of the fuel tank.

DISCLOSURE OF THE INVENTION

<Technical Problem>

In view of the above-described facts, it is a problem to be solved by the present invention to obtain a vehicle underbody structure that is capable of ensuring the capacity of a fuel tank while suppressing an increase in the size of the fuel tank.

<Means for Solving the Problem>

In the present invention, a vehicle underbody structure includes: a floor member that configures a floor portion of a vehicle; a fuel tank that is placed under the vehicle with respect to the floor member; and an exhaust pipe that extends in a vehicle front-rear direction, is equipped with an overlapping section that partially overlaps the fuel tank in a plan view of the vehicle, and is placed between the fuel tank and the floor member, wherein at least the portion of an upper surface of the fuel tank directly under the overlapping section is positioned higher than a full-tank liquid surface in the fuel tank.

In the present invention, the exhaust pipe that extends in the vehicle front-rear direction is equipped with the overlapping section where part of the exhaust pipe partially overlaps the fuel tank in a plan view of the vehicle. At this overlapping section, the exhaust pipe is placed between the fuel tank and the floor member. Because there is no need to form a recessed portion or the like for placing the exhaust pipe on the lower surface of the fuel tank, the lower portion of the fuel tank—that is, the volume of the liquid layer in the fuel tank—does not become smaller. Consequently, it becomes possible to ensure the needed capacity of the fuel tank while suppressing an increase in the size of the fuel tank.

In the present invention, at least the portion of the upper surface of the fuel tank directly under the overlapping section is positioned higher than the full-tank liquid surface in the fuel tank. Thus, the gas layer in the fuel tank reliably exists, directly under the overlapping section, between the liquid layer in the fuel tank and the overlapping section of the exhaust pipe, so this gas layer makes it difficult for the heat of the exhaust pipe to be transmitted to the liquid layer (the fuel) in the fuel tank.

In the present invention, a recessed portion that contains at least part of the overlapping section of the exhaust pipe may be formed in at least the upper surface of the fuel tank, for example. By containing at least part of the overlapping section of the exhaust pipe in this recessed portion, space efficiency can be increased. Because the recessed portion is formed in the upper surface of the fuel tank and does not reduce the volume of the portion of the liquid layer in the fuel tank, it has no impact or little impact on ensuring the capacity of the fuel tank.

In the present invention, a lower surface of the fuel tank may be made flat. Thus, the aerodynamic characteristics of the vehicle can be improved without using a member such as an undercover.

In the present invention, the exhaust pipe may be, on the vehicle front side of the overlapping section, placed lower than the overlapping section. Thus, space efficiency on the front side of the overlapping section can be increased.

In the present invention, the recessed portion may be formed continuously from the upper surface to a front surface of the fuel tank. Because the exhaust pipe can be partially contained in the recessed portion also on the front surface of the fuel tank, it becomes possible to further increase space efficiency.

In the present invention, the exhaust pipe may be placed without contacting the fuel tank. Thus, transmission of heat from the exhaust pipe to the fuel tank can be suppressed, and the occurrence of evaporated fuel in the fuel tank can be suppressed.

Advantageous Effects of the Invention

The present invention is given the above-described configuration, so it is capable of ensuring the capacity of a fuel tank while suppressing an increase in the size of the fuel tank.

BEST MODES FOR CARRYING OUT THE INVENTION

Figure 1:
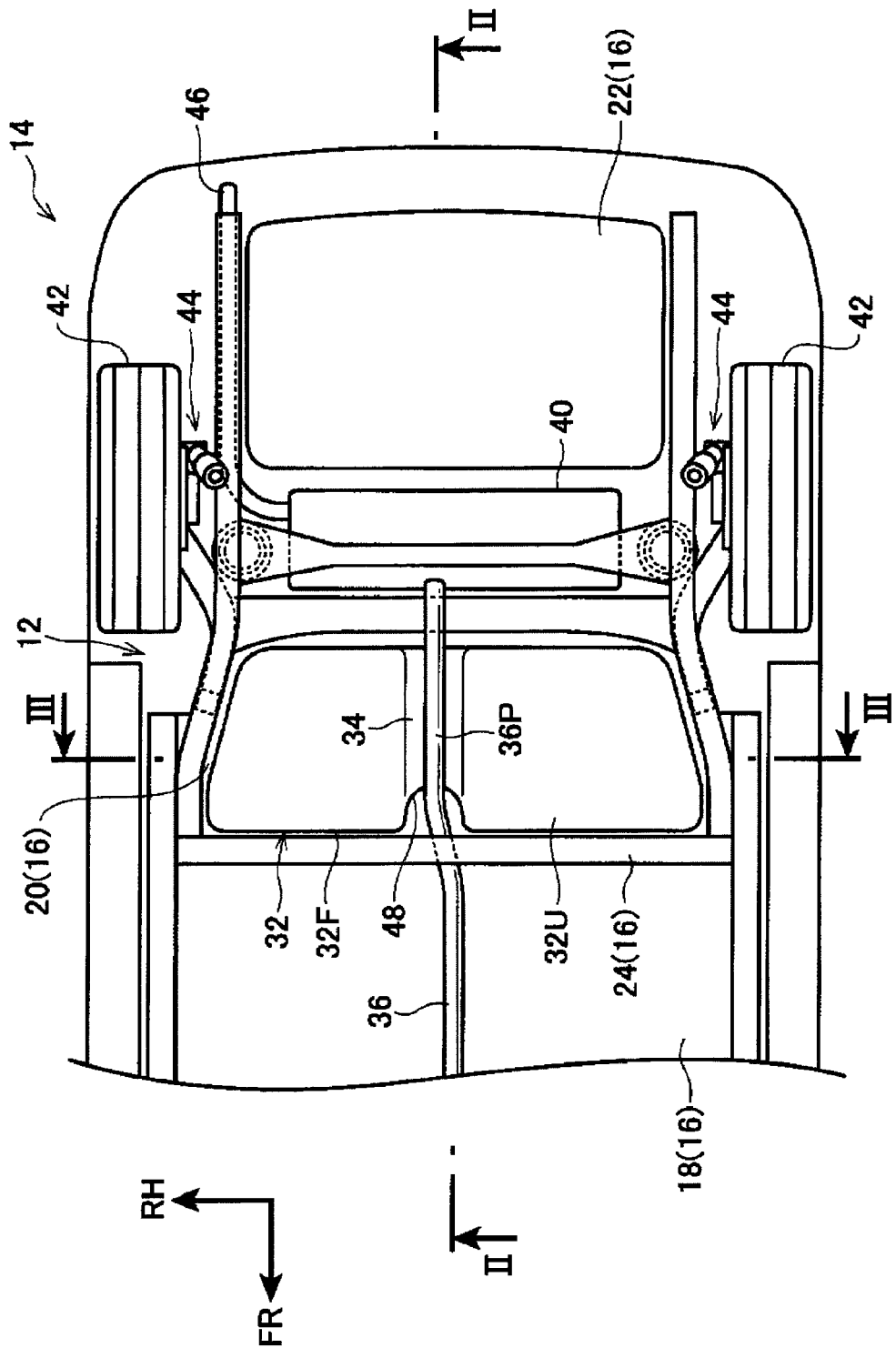
FIG. 1 is a plan view schematically showing an underbody of a vehicle to which a vehicle underbody structure of a first embodiment of the present invention is applied.
Figure 2:
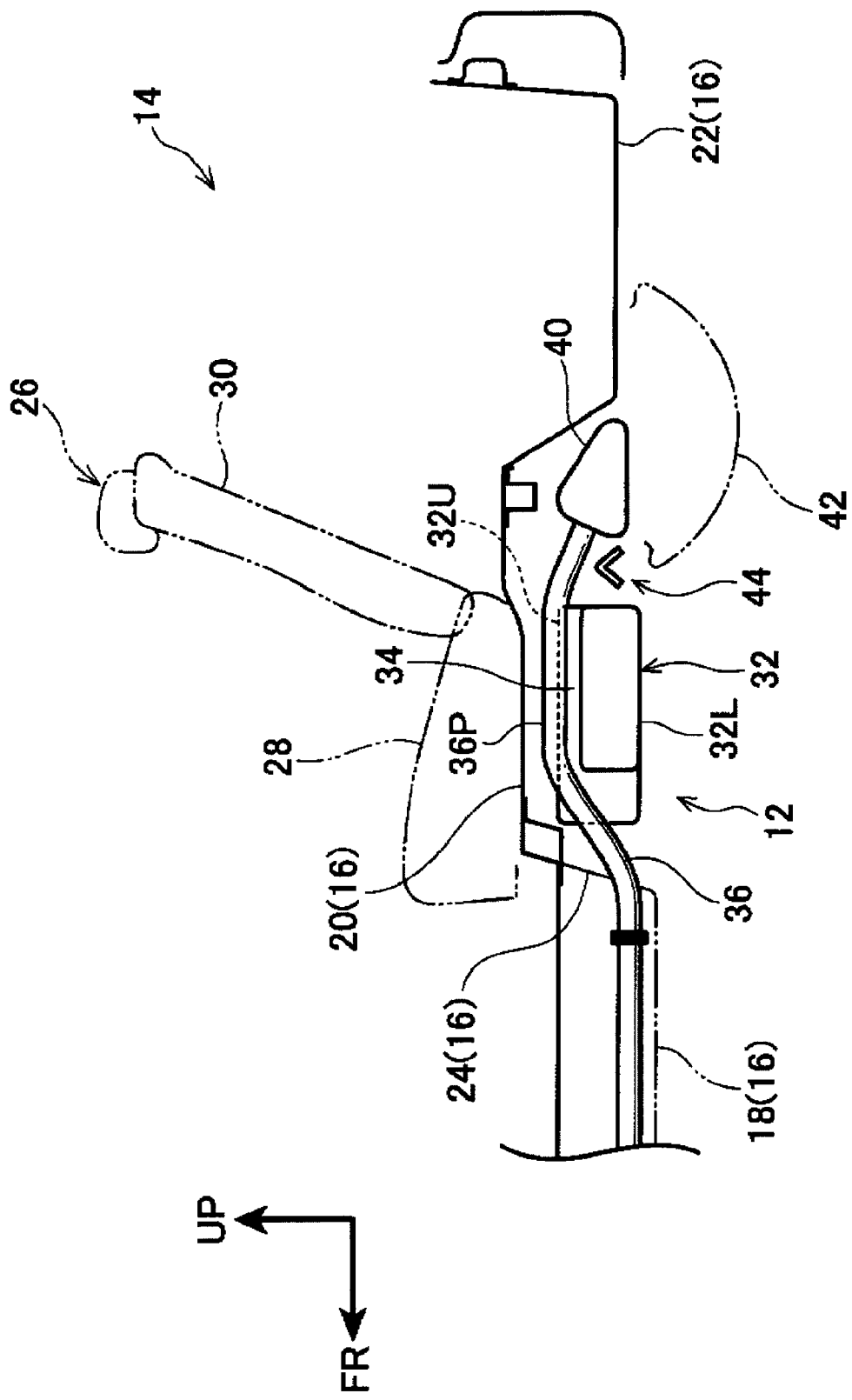
FIG. 2 is a sectional view along line II-II of FIG. 1 schematically showing the underbody of the vehicle to which the vehicle underbody structure of the first embodiment of the present invention is applied.
Figure 3A:
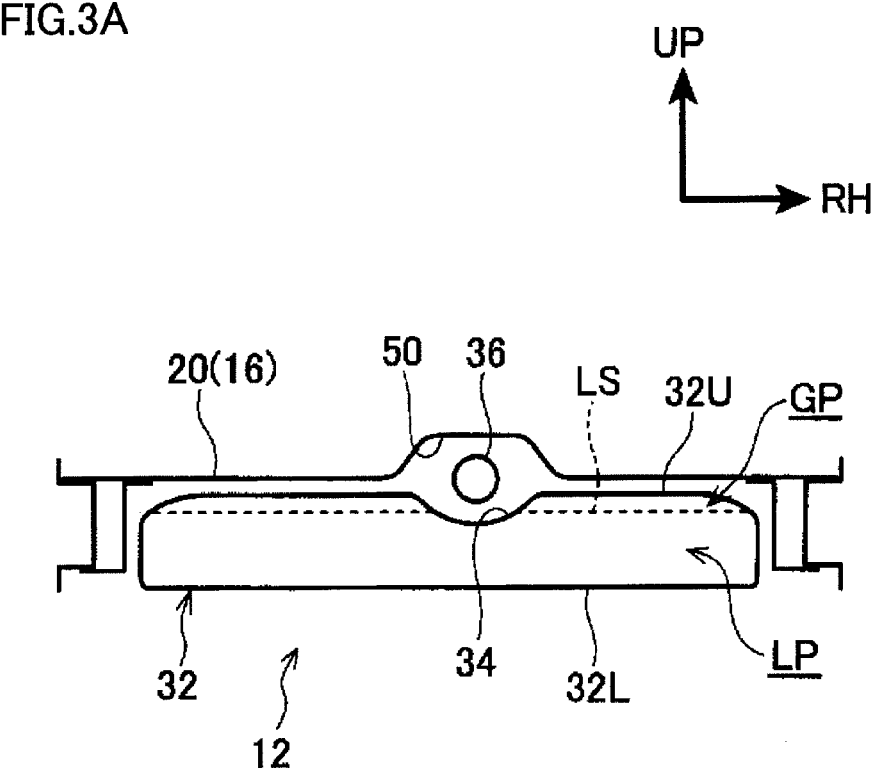
FIG. 3A is a sectional view along line of FIG. 1 schematically showing the underbody of the vehicle to which a vehicle underbody structure of a reference example of the present invention is applied.
Figure 3B:
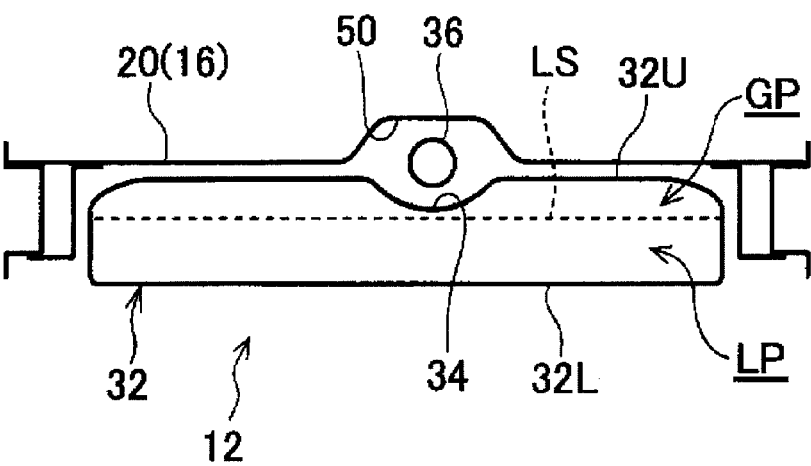
FIG. 3B is a sectional view showing, in the same section as in FIG. 3A, the underbody of the vehicle to which the vehicle underbody structure of the first embodiment of the present invention is applied.

In FIG. 1, FIG. 2 and FIG. 3B, there is schematically shown the underbody of a vehicle 14 to which a vehicle underbody structure 12 of a first embodiment of the present invention is applied. Further, in FIG. 4, the vehicle underbody structure 12 is partially shown. In the drawings, arrow FR represents a vehicle front, arrow RH represents a vehicle width direction right side, and arrow UP represents up. Further, when simply "in front of" and "behind" are used below, these will be taken to mean "on the vehicle front side of" and "on the vehicle rear side of", respectively.

The vehicle 14 has a front floor 18, a center floor 20, and a rear floor 22 from the vehicle front side toward the rear side. These are a floor member 16 in the present invention. The front floor 18 is disposed in a lower position than the center floor 20, and the front floor 18 and the center floor 20 are made continuous by a step portion 24. As shown in FIG. 2, a seat 26 equipped with a seat cushion 28 and a seat back 30 is mounted on the center floor 20.

As shown in detail in FIG. 2, a fuel tank 32 is mounted behind the front floor 18 and under the center floor 20. Fuel supplied to an engine (not shown) of the vehicle 14 is contained in the fuel tank 32.

Figure 4:
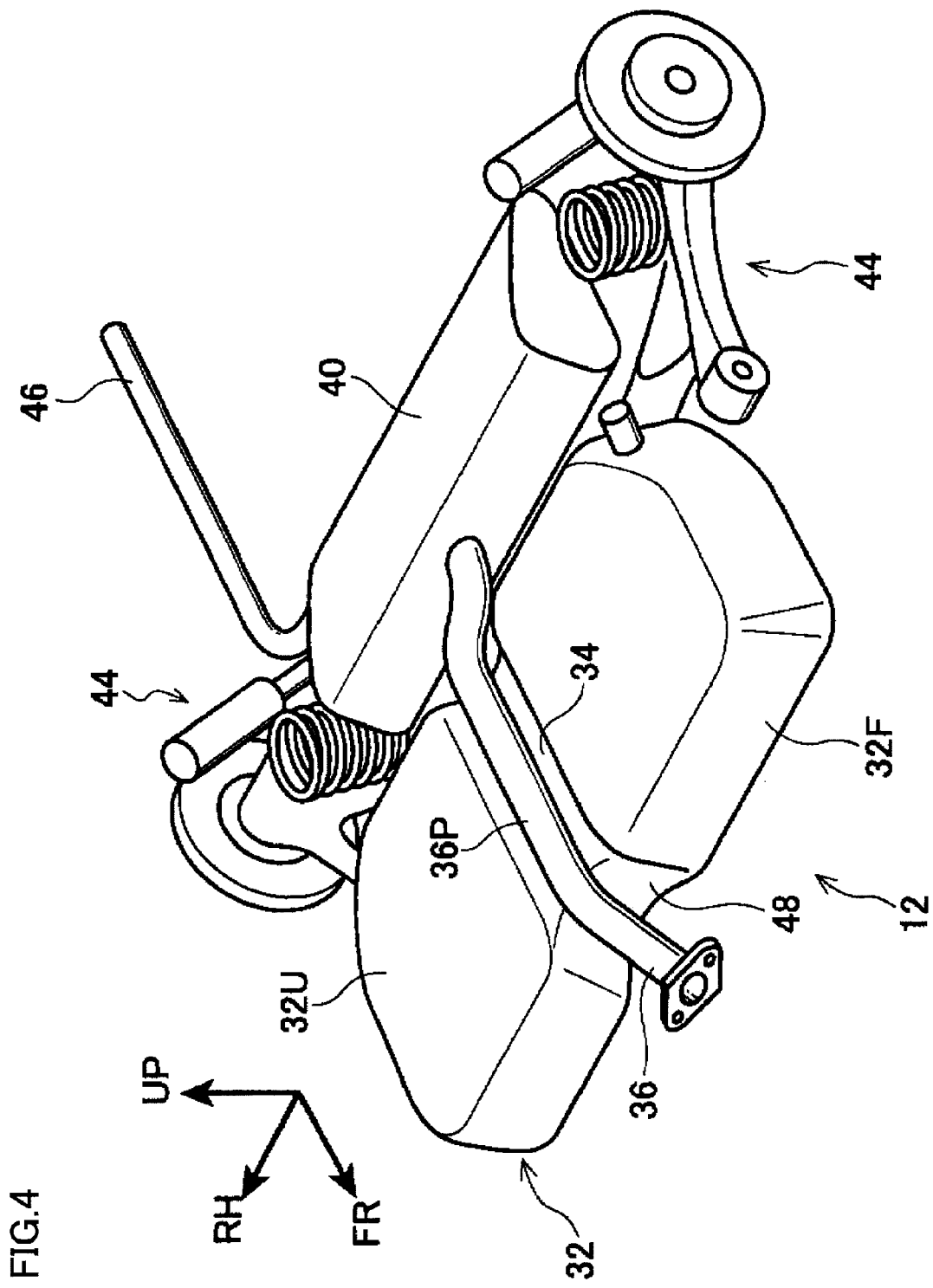
FIG. 4 is a perspective view partially showing the underbody of the vehicle to which the vehicle underbody structure of the first embodiment of the present invention is applied.

As shown also in FIG. 4, in an upper surface 32U of the fuel tank 32, a recessed portion 34 where the plate material configuring this fuel tank is recessed downward is formed in a position in the vehicle width direction substantial center. That is, the fuel tank 32 is given a locally thin shape by the recessed portion 34.

Further, on both vehicle width direction sides of the recessed portion 34, the upper surface 32U of the fuel tank 32 is placed in a position near the center floor 20. A recessed portion 48 is also formed in a front surface 32F of the fuel tank 32, and the recessed portion 34 and the recessed portion 48 are continuous.

In contrast, such a recessed portion is not formed in a lower surface 32L of the fuel tank 32; rather, the lower surface 32L of the fuel tank 32 is given a flat shape. "Flat shape" here means flat to the extent that, as mentioned later, there is no impact on the fuel quantity that can be contained in the fuel tank 32 (the volume of a portion of a liquid layer LP); for example, a bead or a rib for reinforcing the lower surface 32L may also be formed thereon. Additionally, as will be understood from FIG. 2, the position of the fuel tank 32 is adjusted, and the fuel tank 32 is mounted on the vehicle body, such that the lower surface 32L of the fuel tank 32 becomes substantially even with (substantially the same height in the vertical direction as) the front floor 18. Particularly in the present embodiment, a lower surface 40L of a muffler 40 and the rear floor 22 are also given the same height, and the entire vehicle body from the front floor 18 via the lower surface of the fuel tank 32 and the lower surface of the muffler 40 to the rear floor 22 is substantially flattened.

An exhaust pipe 36 extends from the unillustrated engine. The exhaust pipe 36 extends in the vehicle front-rear direction as shown in FIG. 1 and FIG. 2. Tracing the exhaust pipe 36 from the vehicle front side, the exhaust pipe 36 passes under the front floor 18 in the vehicle width direction substantial center. Then, from a position past the front floor 18, the exhaust pipe 36 rises diagonally upward toward the vehicle rear.

Moreover, the exhaust pipe 36 extends toward the vehicle rear and partially overlaps the fuel tank 32 when the vehicle 14 is seen in a plan view (see FIG. 1). The exhaust pipe 36 is positioned between the fuel tank 32 and the floor member 16 (the center floor 20) at this overlapping section 36P.

Further, the exhaust pipe 36 is contained in the recessed portion 34 of the fuel tank 32 at the overlapping section 36P. The exhaust pipe 36 maintains a state where it is positioned between the fuel tank 32 and the floor member 16 (the center floor 20) in this way. Additionally, part (may also be all) of the overlapping section 36P when seen in a section in the vehicle width direction is contained in the recessed portion 34 and extends toward the vehicle rear.

The exhaust pipe 36 is, on the front side of the fuel tank 32, partially contained in the recessed portion 48. The exhaust pipe 36 is also, on the front side thereof, placed in a relatively lower position than the overlapping section 36P. In this way, by placing the exhaust pipe 36 lower on the front side of the overlapping section 36P, the space efficiency of the vehicle 14 increases. For example, it becomes possible to position the front floor 18 lower than the center floor 20.

Also, as will also be understood from FIG. 3B, in the present embodiment, the exhaust pipe 36 is supported on the vehicle body by an unillustrated support member such that a clearance arises between the exhaust pipe 36 and the fuel tank 32. That is, the exhaust pipe 36 and the fuel tank 32 are made contactless. Air exists between the exhaust pipe 36 and the fuel tank 32, and transmission of heat from the exhaust pipe 36 to the fuel tank 32 is suppressed.

In the present embodiment, the vehicle underbody is also particularly be given the structure shown in FIG. 3B. In this structure, the upper surface 32U is given a shape where the recessed portion 34 is positioned higher than a liquid surface LS set in the fuel tank 32, and a gas layer GP (a thermal barrier) in the fuel tank 32 exists directly under the overlapping section 36P of the exhaust pipe 36. In this way, because the gas layer GP in the fuel tank 32 exists directly under the overlapping section 36P, transmission of heat from exhaust pipe 36 to the fuel is further suppressed. As the liquid surface LS in this case, considering a full-tank liquid surface (which is set to a position a predetermined amount lower than the upper surface of the fuel tank 32) that is set by a full-tank regulating valve (not shown) in the fuel tank 32, by giving the upper surface 32U a shape where the recessed portion 34 is positioned higher than the full-tank liquid surface, a state where the gas layer GP exists between the exhaust pipe 36 and the liquid layer LP in the fuel tank 32 directly under the overlapping section 36P of the exhaust pipe 36 can be more reliably realized.

In the center floor 20 also, a recessed portion 50 that is recessed upward is formed in the substantial center portion thereof in the vehicle width direction. The exhaust pipe 36 is also partially contained in this recessed portion 50 or is placed in a position where a clearance arises between the exhaust pipe 36 and the center floor 20. For this reason, transmission of heat from the exhaust pipe 36 to the center floor 20 is suppressed.

The muffler 40 is disposed on the vehicle rear side of the fuel tank 32. Moreover, rear suspensions 44 (shown only partially in FIG. 2) that suspend rear wheels 42 of the vehicle 14 are disposed in positions on both vehicle width direction sides of the muffler 40.

In the present embodiment, in particular, the muffler 40 is transversely placed such that its lengthwise direction coincides with the vehicle width direction, and the exhaust pipe 36 is connected to the muffler 40 in the vehicle width direction substantial center. The exhaust pipe 36 is connected to the muffler 40, and, moreover, an exhaust pipe 46 (see FIG. 1) extends from the muffler 40 toward the vehicle rear.

Next, the action of the vehicle underbody structure 12 of the present embodiment will be described.

Figure 5:
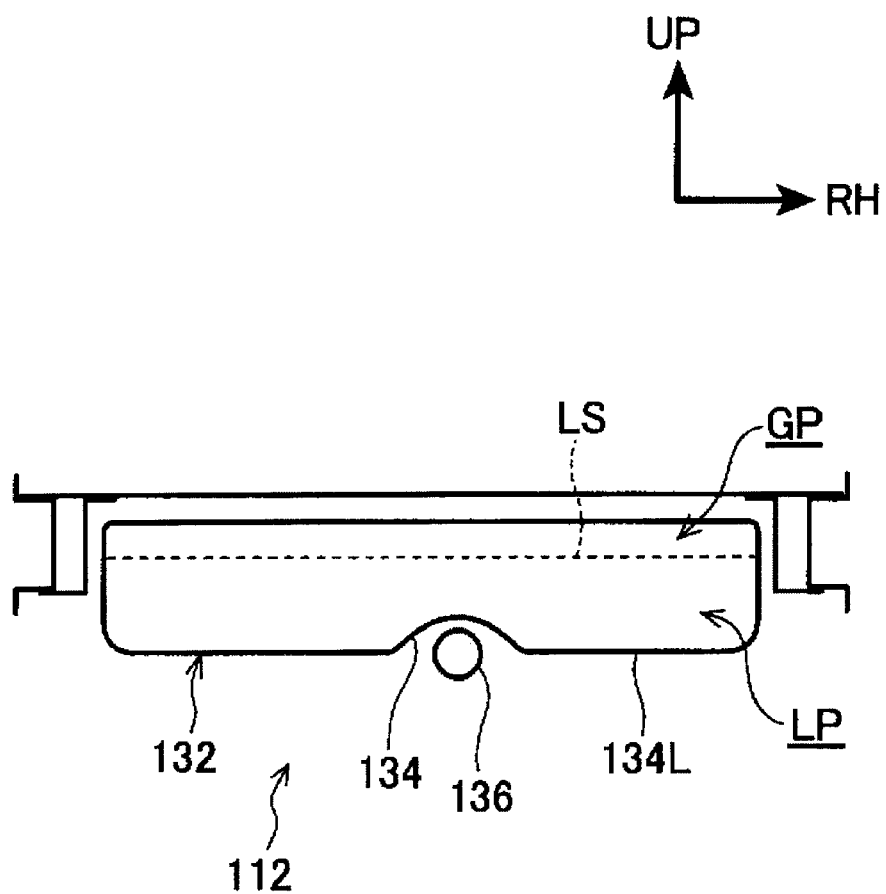
FIG. 5 is a sectional view in a vehicle width direction schematically showing an underbody of a vehicle to which a vehicle underbody structure of a comparative example is applied.

In the vehicular underbody structure 12 of the present embodiment, the exhaust pipe 36 is placed between the fuel tank 32 and the floor member 16 at the overlapping section 36. Here, in FIG. 5, a vehicle underbody structure 112 where an exhaust pipe 136 is placed under a fuel tank 132 is given as a comparative example. In the vehicle underbody structure 112 of the comparative example, in order for the exhaust pipe 136 to not project lower than a lower surface 132L of the fuel tank 132 or to decrease the projection amount, a recessed portion 134 is formed in the lower surface 132L.

However, in the fuel tank 132 of the structure where the recessed portion 134 is formed in the lower surface 132L in this way, the fuel quantity that can be contained inside ends up decreasing. That is, taking the liquid surface LS inside the fuel tank 132 as a boundary, the lower layer becomes the liquid layer LP and the upper layer becomes the gas layer GP, so the recessed portion 134 ends up entering the portion of the liquid layer LP. Thus, in order to ensure the fuel quantity that can be contained in the fuel tank 132, there arises the need to increase the fuel tank 132 in the vehicle front-rear direction, the vehicle width direction, or the vertical direction, so the fuel tank 132 increases in size. Further, although an example where a recessed portion that contains the exhaust pipe 136 is formed in a side surface of the fuel tank 132 is also conceivable, even in this case, the fuel quantity that can be contained in the fuel tank 132 where part of the recessed portion ends up extending greatly into the liquid layer LP in the fuel tank decreases.

In contrast, in the present embodiment, as will be understood from FIG. 3B, there is no need to form the recessed portion 134 of the comparative example in the lower surface 32L of the fuel tank 32. That is, like the comparative example shown in FIG. 5, considering the gas layer GP and the liquid layer LG whose boundary is the liquid surface LS, the volume of the portion of the liquid level LP in the fuel tank 32 does not decrease, or, even if it were to decrease, the amount thereof would be slight. Consequently, a sufficient quantity can be ensured as the fuel quantity that can be contained without increasing the size of the fuel tank 32.

Also, in the present embodiment, the recessed portion 34 is disposed in the upper surface 32U of the fuel tank 32, and part of the exhaust pipe 36 is contained in this recessed portion 34. Substantively, on both side portions of the recessed portion 34 in the vehicle width direction, the fuel tank 32 is placed near the center floor 20. In other words, the clearance between the fuel tank 32 and the center floor 20 decreases, and the fuel tank 32 exists in this clearance portion. For this reason, the fuel tank 32 can be further miniaturized (the containable fuel quantity is ensured), and space efficiency in a case where, for example, another member is placed around the fuel tank 32 increases.

Moreover, in the present embodiment, the recessed portion 34 is formed not only in the upper surface 32U of the fuel tank 32 but also in the front surface 32F, and the exhaust pipe 36 is also partially contained in the recessed portion 34 of this front surface 32F. Compared to a configuration where the recessed portion 34 is not disposed in the front surface 32F, the exhaust pipe 36 is positioned on the vehicle rear side at this portion by the amount it enters the recessed portion 34. For this reason, space efficiency on the vehicle front side of the fuel tank 32 increases.

Additionally, the lower surface 32L of the fuel tank 32 is made flat and is given the same height as the front floor 18. Particularly in the present embodiment, the entire vehicle body from the front floor 18 via the lower surface 32L of the fuel tank 32 and the lower surface of the muffler 40 to the rear floor 22 is substantially flattened, that is, is given a substantially identical height. Thus, because the underside of the vehicle becomes generally flat overall without disposing an aerodynamic member such as an undercover, it becomes possible to improve its aerodynamic characteristics.

Also, because an aerodynamic member is unneeded, the number of parts decreases and the configuration becomes lightweight and low-cost. Moreover, the man-hours for assembling an aerodynamic member to the vehicle body also disappear. Additionally, because there is no situation where only the fuel tank 32 projects lower than other members (the front floor 18, the muffler 40, and the rear floor 22), there is also no situation where the ground clearance of the vehicle is inadvertently lowered, and sufficient ground clearance can be ensured.

Particularly in the structure shown in FIG. 3B, the gas layer GP (the thermal barrier) in the fuel tank 32 exists directly under the overlapping section 36P of the exhaust pipe 36. Here, considering the structure of the comparative example shown in FIG. 5, the gas layer in the fuel tank does not exist between the exhaust pipe and the fuel (the liquid layer) in the fuel tank. In the structure in FIG. 3B, compared to the structure of this comparative example, some or all of the heat of the exhaust pipe 36 is blocked by the gas layer GP, and it becomes difficult for that heat to be transmitted to the fuel, so a temperature rise in the fuel and the occurrence of evaporated fuel accompanying this temperature rise can be suppressed. Also, because a member (a heat insulator or the like) for suppressing heat transmission from the exhaust pipe 36 to the fuel becomes unneeded in this way, the number of parts decreases and the configuration becomes lightweight and low-cost.

Also, in the present embodiment, a clearance is disposed between the exhaust pipe 36 and the fuel tank 32 to make them contactless and suppress the direct transmission of heat from the exhaust pipe 36 to the fuel tank 32. Because of this also, a temperature rise in the fuel in the fuel tank 32 and the occurrence of evaporated fuel accompanying this temperature rise can be suppressed.

As will be understood from the above description, in the present embodiment, an increase in the size of the fuel tank 32 is suppressed while the needed quantity is ensured as the fuel quantity containable in the fuel tank 32. Additionally, because of this, the degree of freedom of the placement of members around the fuel tank 32 becomes higher as compared to a structure equipped with a fuel tank whose size has been increased in order to ensure capacity (see, for example, the fuel tank 132 of the comparative example shown in FIG. 5). This point will be described below with reference to FIG. 6 to FIG. 11. In each of these drawings, the fuel tank 132 indicated by a double-dash chain line is the fuel tank of the comparative example, and its size is increased in any direction such as up, down, front, and rear as compared to the fuel tank 32 of the present embodiment.

Figure 6:
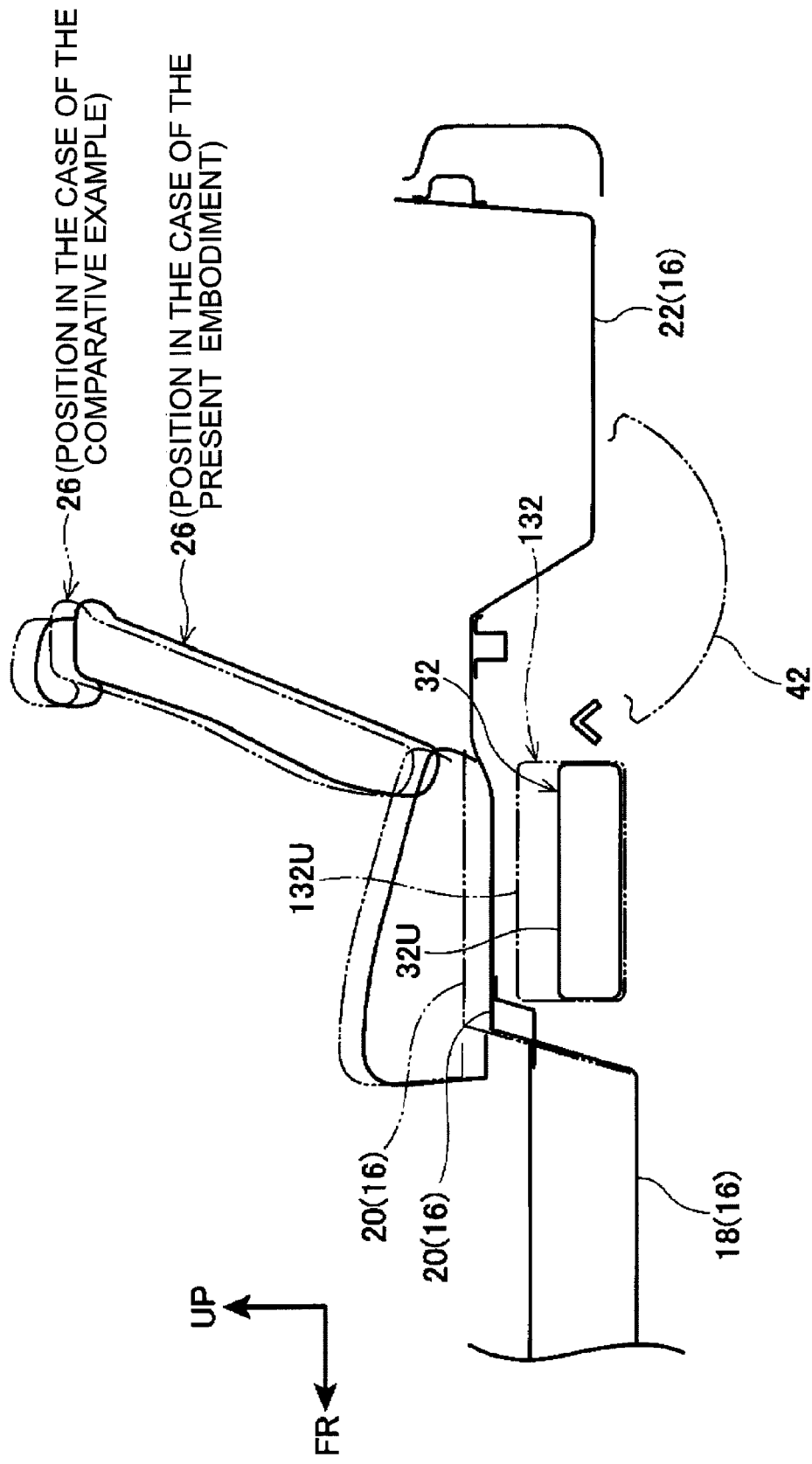
FIG. 6 is an explanatory diagram showing the placement of members in the vehicle to which the vehicle underbody structure of the first embodiment of the present invention is applied.

In FIG. 6, the height of the fuel tank 132 of the comparative example is higher than that of the fuel tank 32 of the present embodiment, and the position of its upper surface 132U is higher than the upper surface 32U of the fuel tank 32 of the present embodiment.

When compared with this fuel tank 132, the degree of freedom of upper space utilization becomes higher in the fuel tank 32 of the present embodiment. For example, in FIG. 6, the center floor 20 and the seat 26 pertaining to the comparative example are both indicated by a double-dash chain line, and it becomes possible to place the seat 26 in a lower position (in the position indicated by a solid line in FIG. 6) than in the comparative example. In this way, the example where the seat 26 or the like is placed in a low position can, for example, be preferably applied to an automobile whose vehicle height is low.

Figure 7:
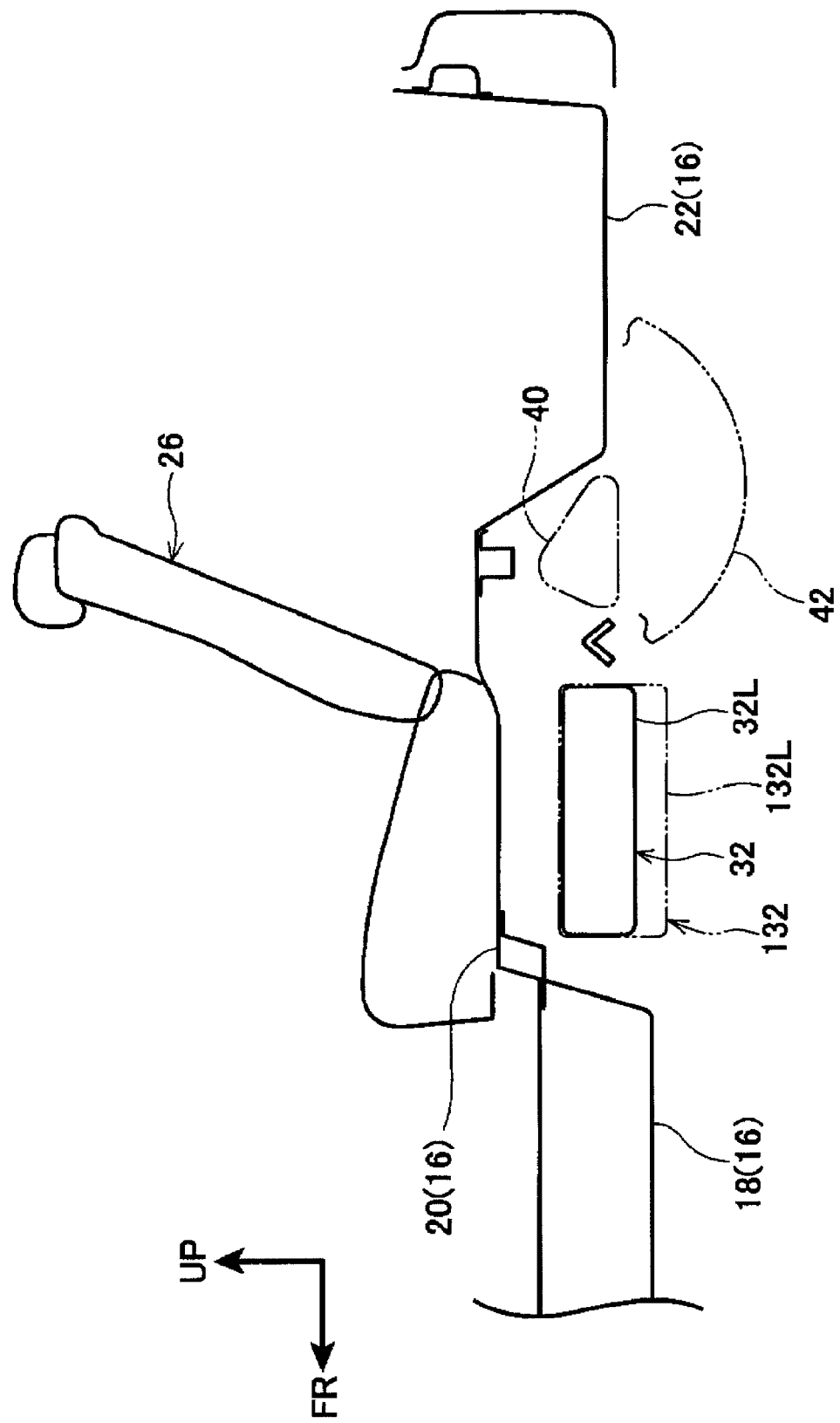
FIG. 7 is an explanatory diagram showing the placement of members in the vehicle to which the vehicle underbody structure of the first embodiment of the present invention is applied.

In FIG. 7, as the fuel tank 132 of the comparative example, there is given a fuel tank whose height is higher than that of the fuel tank 32 of the present embodiment and in which the position of its lower surface 132L is lower than that of the lower surface 32L of the fuel tank 32 of the present embodiment.

In this fuel tank 132, it is difficult to give the lower surface 132L a height that is identical to that of the lower surfaces of the front floor 18 and the muffler 40, and it is also difficult to flatten the underside of the entire vehicle. Also, because the fuel tank 132 projects downward, there is the fear that the ground clearance will also become higher. In contrast, in the present embodiment, it is possible to flatten the underside of the entire vehicle, and it becomes possible to also ensure a high ground clearance. For example, the present embodiment can be preferably applied to an automobile with enhanced rough road traveling performance.

Figure 8:
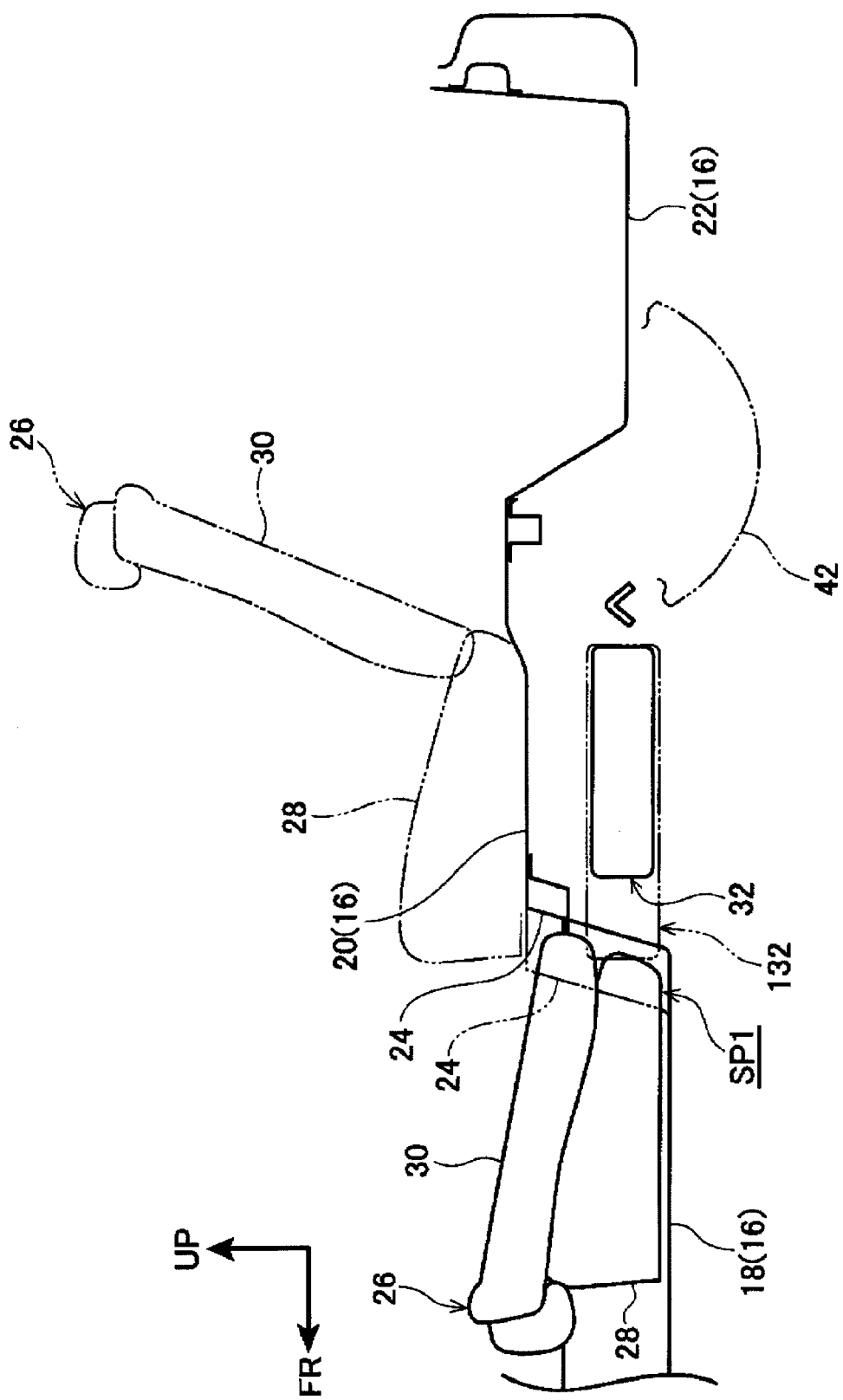
FIG. 8 is an explanatory diagram showing the placement of members in the vehicle to which the vehicle underbody structure of the first embodiment of the present invention is applied.

The fuel tank 132 of the comparative example shown in FIG. 8 bulges more toward the vehicle front side than the fuel tank 32 of the present embodiment. In the present embodiment, it is possible to place the step portion 24 more toward the vehicle rear side than in the comparative example, and a containment space SP1 that contains part of the seat when the seat back 30 is forwardly collapsed can be ensured on the vehicle front side of the step portion 24.

However, the step portion 24 of the comparative example (indicated by a double-dash chain line) is positioned more toward the vehicle front side than the step portion 24 of the present embodiment (indicated by a solid line), and the containment space SP1 cannot be ensured. That is, in the present embodiment, it also becomes possible to increase variations in the seat arrangement.

Figure 9:
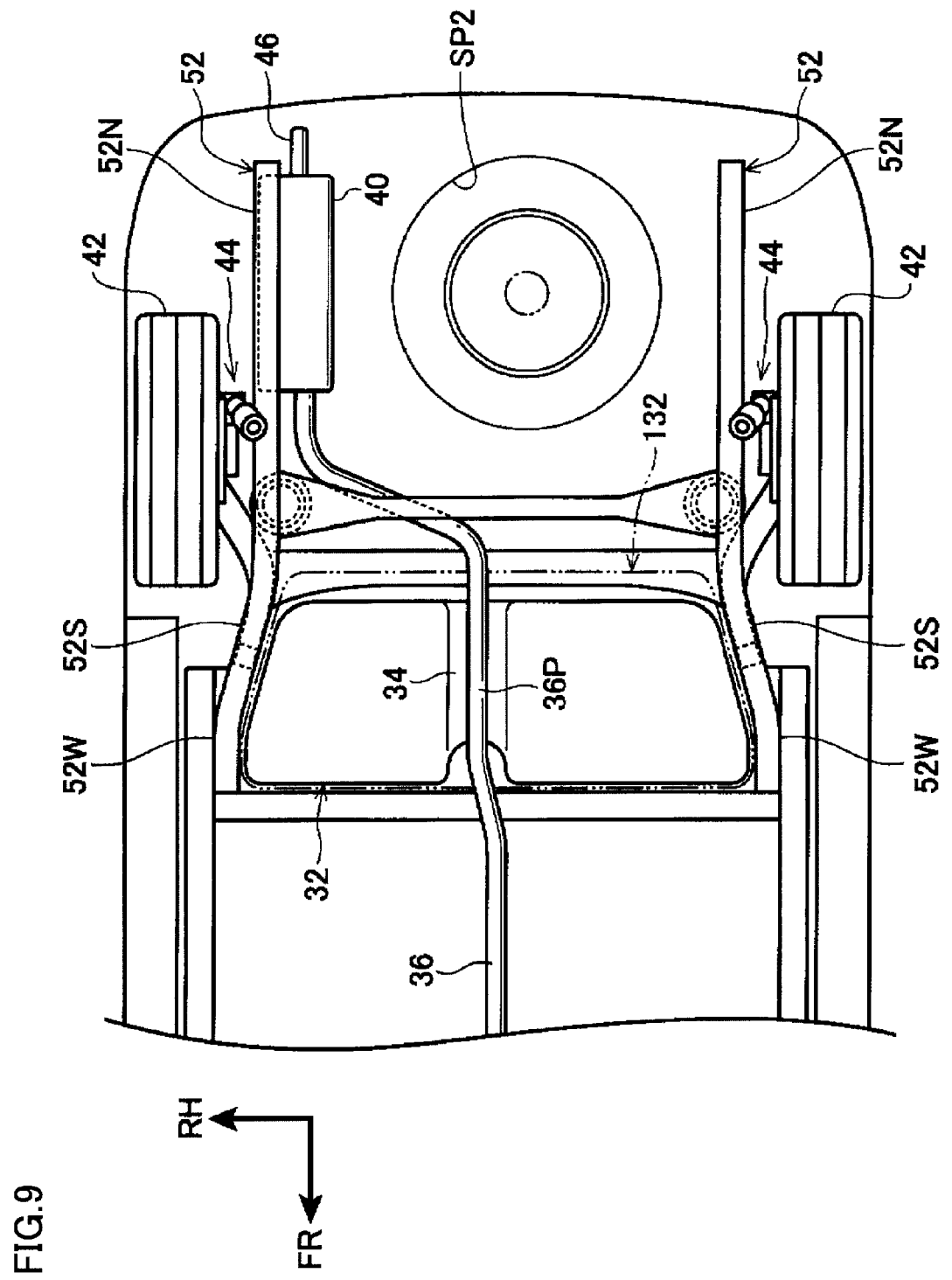
FIG. 9 is an explanatory diagram showing the placement of members in the vehicle to which the vehicle underbody structure of the first embodiment of the present invention is applied.

The fuel tank 132 of the comparative example shown in FIG. 9 bulges more toward the vehicle rear side than the fuel tank 32 of the present embodiment. Compared to this fuel tank 132, in the fuel tank 32 of the present embodiment, a space that is wider on the vehicle rear side than in the comparative example can be ensured, so various members can be placed by utilizing this space. For example, large rear suspensions 44 can be placed to enhance suspension performance. Further, it is also possible to configure a containment space SP2 for a spare tire on the rear floor. Moreover, as shown in FIG. 10, it is also possible, for example, to place a drive member 56 such as a motor that bears part or all of the driving force of the rear wheels in the space on the rear side of the fuel tank 32.

Figure 10:
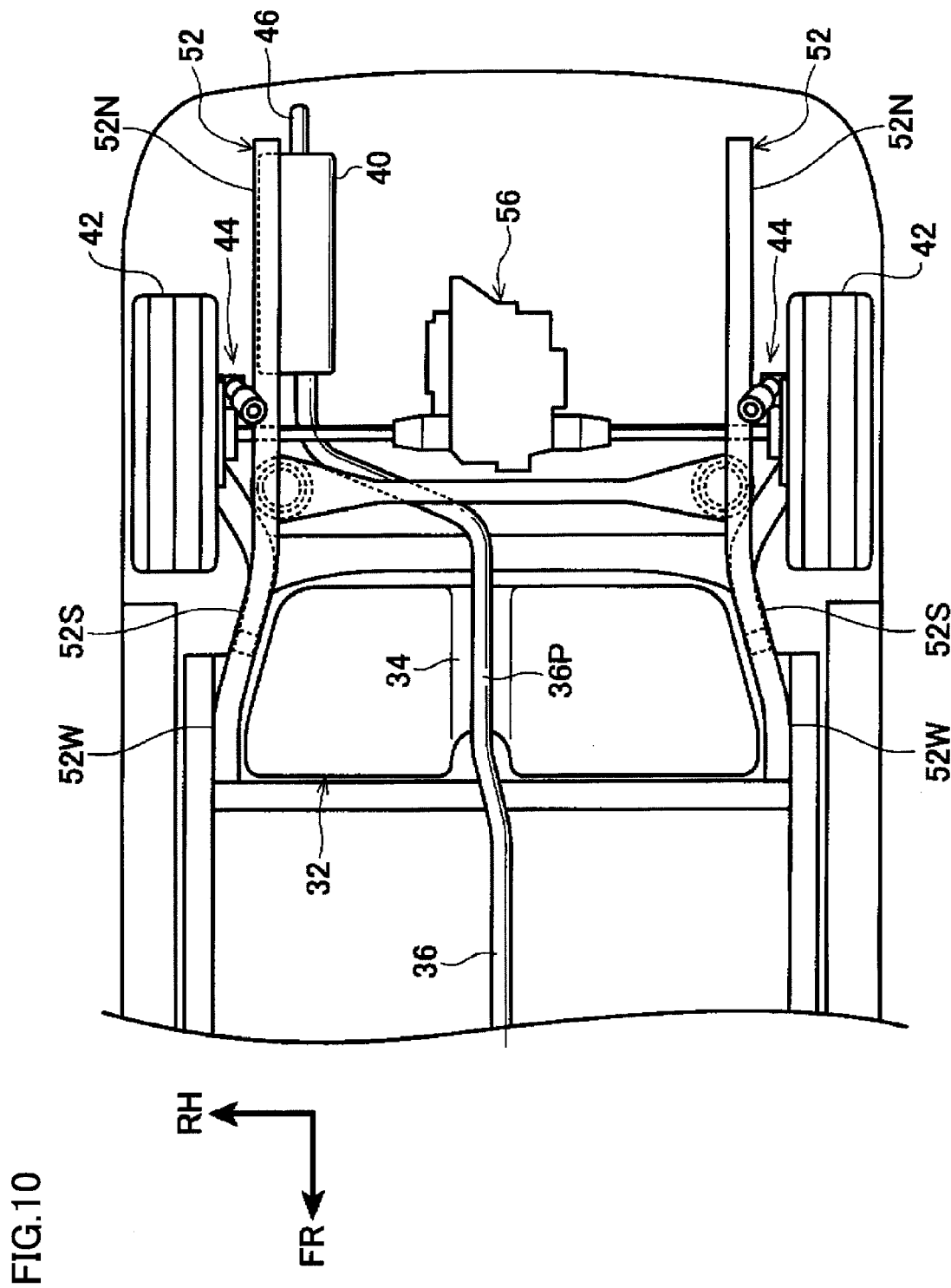
FIG. 10 is an explanatory diagram showing the placement of members in the vehicle to which the vehicle underbody structure of the first embodiment of the present invention is applied.

Also, in the examples shown in FIG. 9 and FIG. 10, the muffler 40 is given a longitudinal placement (so that the lengthwise direction of the muffler 40 coincides with the vehicle front-rear direction) to further increase space efficiency on the rear side of the fuel tank 32. Alternatively, instead of placing these members on the vehicle rear side of the fuel tank 32, the position of the vehicle rear body (a back door, etc.) may also be moved toward the front side to miniaturize the vehicle.

Further, in the present embodiment, by shortening the width of the fuel tank 32, the degree of freedom of the shape and placement of members in the space on the vehicle width direction outer sides of the fuel tank 32 (e.g., vehicle frame members such as side members 52 and 54 positioned on the vehicle width direction outer sides of the fuel tank 32) also becomes higher.

For example, in the side members 52 shown in FIG. 9 and FIG. 10, the members on the vehicle front side of the fuel tank 32 are configured as narrow portions 52N where the width between the side members 52 is relatively narrow, the members on the vehicle rear side of the fuel tank 32 are configured as wide portions 52W where the width is wide, and the narrow portions 52N and the wide portions 52W are made continuous by slanting portions 52S.

Figure 11:
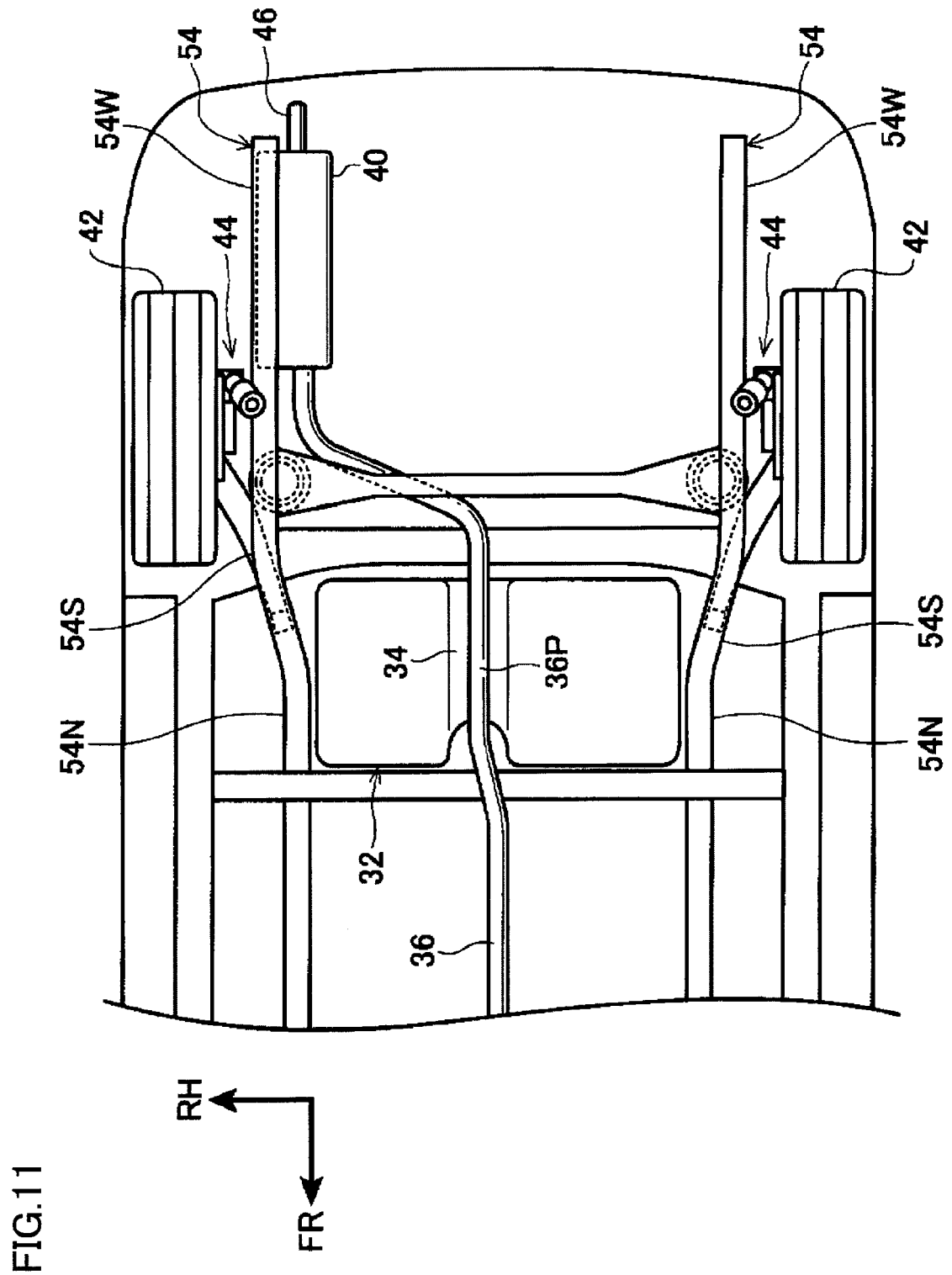
FIG. 11 is an explanatory diagram showing the placement of members in the vehicle to which the vehicle underbody structure of the first embodiment of the present invention is applied.

In the side members 54 shown in FIG. 11, the members on the vehicle front side are configured as wide portions 54W, the members on the vehicle rear side are configured as narrow portions 54N, and the wide portions 54W and the narrow portions 54N are made continuous by slanting portions 54S. In this way, because the degree of freedom becomes higher for the shape and placement of the vehicle frame members, there become fewer restrictions in terms of the shape and structure of the vehicle overall, and the invention can correspond to the structures and shapes of many types of vehicles.

Figure 12:
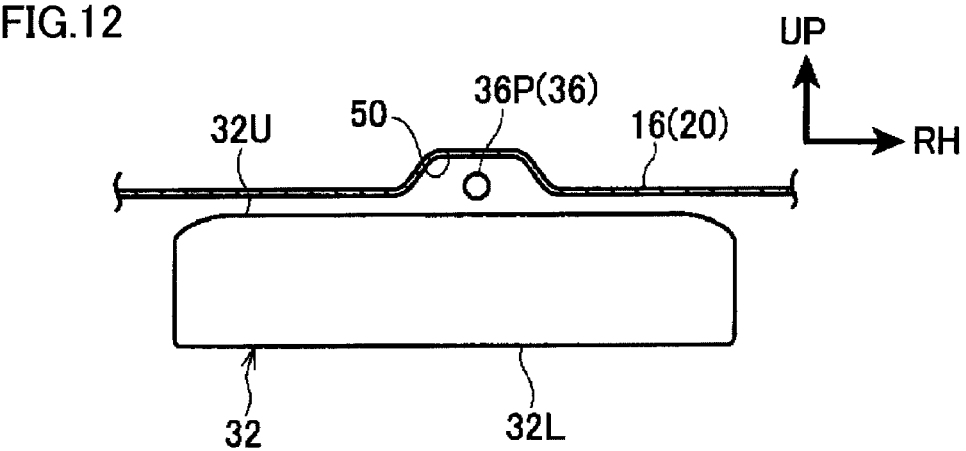
FIG. 12 is an explanatory diagram showing the structure of a fuel tank and a floor member included in the vehicle underbody structure of the present invention.

In the above description, an example is given where the recessed portions 34 and 48 are formed in the fuel tank 32 and where the recessed portion 50 is also formed in the center floor 20, but in terms of the essence of the present invention, it suffices for the exhaust pipe 36 to be placed between the fuel tank 32 and the floor member 16 (which is not limited to the center floor 20) at the overlapping section 36P where the exhaust pipe 36 overlaps the fuel tank 32. For example, as shown in FIG. 12, the invention may also have a structure where the recessed portion 34 is not formed in the fuel tank 32. In this structure, the gas layer inevitably comes to exist between the exhaust pipe 36 and the liquid layer in the fuel tank 32 (at the time of a full-tank liquid level), and it becomes difficult for the heat of the exhaust pipe 36 to be transmitted to the fuel. In the structure in FIG. 12, for example, there is no need for the upper surface 32U of the fuel tank 32 to be flat, and, for example, a bulge portion that bulges upward partially or a convex portion may also be formed on part of the upper surface 32U.

Figure 13:
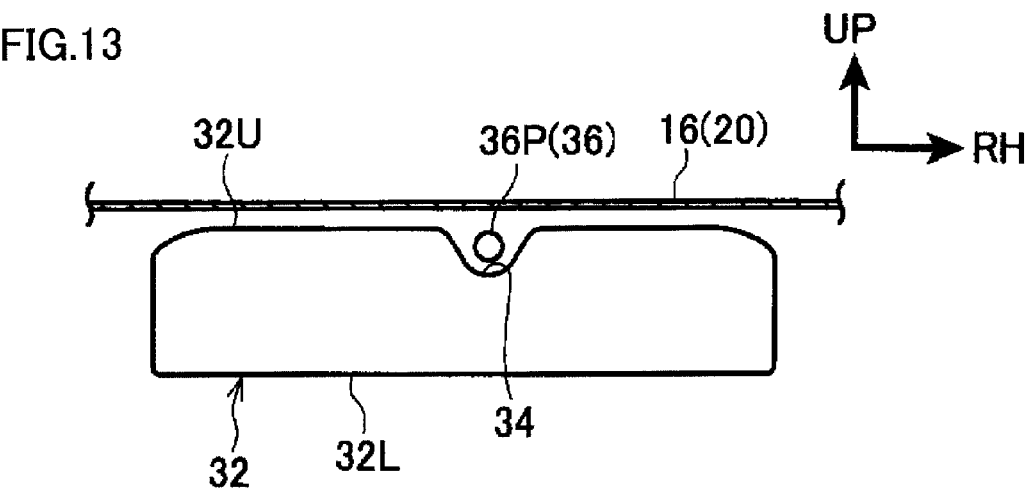
FIG. 13 is an explanatory diagram showing the structure of the fuel tank and the floor member included in the vehicle underbody structure of the present invention.

Further, as shown in FIG. 13, the invention may also have a configuration where the recessed portion 50 is not formed in the floor member 16. The position of the recessed portion 34 formed in the fuel tank 32 may also be decided by its positional relationship with the exhaust pipe 36; for example, as shown in FIG. 14, the recessed portion 34 may also be formed in a vehicle width direction end portion in the fuel tank 32.

Figure 14:
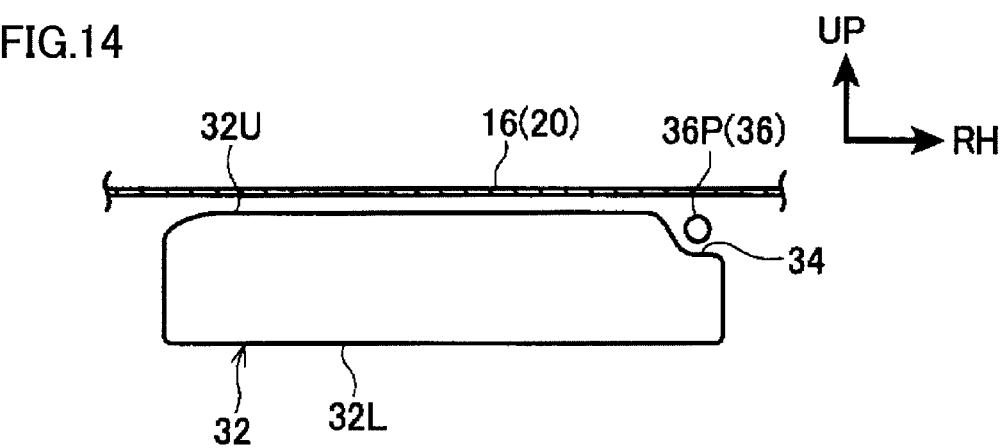
FIG. 14 is an explanatory diagram showing the structure of the fuel tank and the floor member included in the vehicle underbody structure of the present invention.

In both of the structures in FIG. 13 and FIG. 14, like the structure shown in FIG. 3B, the recessed portion 34 (the upper surface 32U) has a shape where the gas layer exists between the exhaust pipe 36 and the liquid layer in the fuel tank 32 (at the time of a full-tank liquid level) directly under the overlapping section 36P of the exhaust pipe 36.

Explanation Of The Reference Signs
12 Vehicle Underbody Structure
14 Vehicle
16 Floor Member
18 Front Floor
20 Center Floor
22 Rear Floor
26 Seat
32 Fuel Tank
34 Recessed Portion
36 Exhaust Pipe
36P Overlapping Section
48 Recessed Portion

The invention claimed is:

1. A vehicle underbody structure comprising:
a floor member that configures a floor portion of a vehicle;
a fuel tank that is placed under the vehicle with respect to the floor member; and
an exhaust pipe that extends in a vehicle front-rear direction, is equipped with an overlapping section that partially overlaps the fuel tank in a plan view of the vehicle, and is placed between the fuel tank and the floor member,
wherein at least a portion of an upper surface of the fuel tank directly under the overlapping section is positioned higher than a full-tank liquid surface in the fuel tank.

2. The vehicle underbody structure according to claim 1, wherein a recessed portion that contains at least part of the overlapping section of the exhaust pipe is formed in at least the upper surface of the fuel tank.

3. The vehicle underbody structure according to claim 2, wherein the recessed portion is formed continuously from the upper surface to a front surface of the fuel tank.

4. The vehicle underbody structure according to claim 1, wherein a lower surface of the fuel tank is made flat.

5. The vehicle underbody structure according to claim 1, wherein the exhaust pipe is, on the vehicle front side of the overlapping section, placed lower than the overlapping section.

* * * * *